United States Patent
Garvey (10) Patent No.: US 7,322,459 B2
(45) Date of Patent: Jan. 29, 2008

(54) DIFFERENTIAL SPEED CONVEYOR ACCUMULATION SYSTEM AND METHOD

(75) Inventor: Mark C. Garvey, Hammonton, NJ (US)

(73) Assignee: Garvey Corporation, Blue Anchor, NJ (US)

( * ) Notice: Subject to any disclaimer, the term of this patent is extended or adjusted under 35 U.S.C. 154(b) by 0 days.

(21) Appl. No.: 11/416,298

(22) Filed: May 1, 2006

(65) Prior Publication Data
US 2007/0261936 A1 Nov. 15, 2007

(51) Int. Cl.
B65G 15/02 (2006.01)

(52) U.S. Cl. ............... 198/461.1; 198/341.09; 198/347; 198/367; 198/442; 198/443; 198/448; 198/580; 198/604; 198/623

(58) Field of Classification Search ............ 198/461.1, 198/623, 341.09, 604, 817, 860.1, 367, 442, 198/443, 580, 347, 448
See application file for complete search history.

(56) References Cited

U.S. PATENT DOCUMENTS

| | | | | |
|---|---|---|---|---|
| 1,930,318 A * | 10/1933 | Mojonnier | ............... | 209/658 |
| 3,599,789 A * | 8/1971 | Kurczak | ............... | 209/577 |
| 4,401,207 A * | 8/1983 | Garvey | ............... | 198/580 |
| 4,715,286 A * | 12/1987 | Parker et al. | ............ | 104/172.3 |
| 4,715,288 A * | 12/1987 | Catena | ............... | 105/154 |
| 4,974,720 A * | 12/1990 | Schoen | ............... | 198/434 |
| 5,054,604 A * | 10/1991 | Horsley et al. | ............ | 198/444 |
| 5,129,504 A * | 7/1992 | Smith | ............... | 198/453 |
| 5,183,146 A * | 2/1993 | Reuteler | ............... | 198/444 |
| 5,551,551 A * | 9/1996 | Crawford | ............... | 198/453 |
| 6,328,151 B1 * | 12/2001 | Spangenberg et al. | ... | 198/347.4 |
| 6,543,600 B2 * | 4/2003 | Ouellette | ............... | 198/358 |
| 6,575,287 B2 * | 6/2003 | Garvey et al. | ............ | 198/418.6 |
| 6,612,417 B2 * | 9/2003 | Garvey | ............... | 198/443 |
| 6,612,425 B1 * | 9/2003 | Garvey | ............... | 198/839 |
| 6,648,124 B1 * | 11/2003 | Garvey | ............... | 198/418.6 |
| 6,959,802 B1 * | 11/2005 | Garvey | ............... | 198/347.1 |
| 7,198,147 B2 * | 4/2007 | Petrovic | ............... | 198/452 |
| 7,222,718 B2 * | 5/2007 | Tarlton | ............... | 198/445 |
| 2003/0106772 A1 * | 6/2003 | Garvey | ............... | 198/443 |
| 2004/0178047 A1 * | 9/2004 | Leisner | ............... | 198/623 |
| 2005/0178640 A1 * | 8/2005 | Petrovic | ............... | 198/447 |

\* cited by examiner

*Primary Examiner*—Gene O. Crawford
*Assistant Examiner*—Kavel Singh
(74) *Attorney, Agent, or Firm*—Stuart M. Goldstein (57) ABSTRACT

A product conveying and accumulation system and method employs a primary product transporting conveyor with accumulation and re-circulating sections. The conveyor is configured to receive products from an upstream destination and discharge products to a downstream destination. A second conveyor, operable at a considerable slower speed than the first conveyor, is located in the same transverse plane as and is aligned adjacent to the first conveyor. Both conveyors travel in the same direction at the adjacent alignment. As products are discharged from the system, a wall of product is formed on the slower moving conveyor. As a result, products on the inner lane of the faster moving conveyor which would otherwise tend to move inward towards the discharge point, causing product turbulence and disruption, are urged back onto the inner lane by the product wall and then smoothly discharged from the system to the downstream destination. The use of this slower conveyor increases product stability by substantially eliminating product turbulence caused by the product bunching and nesting which normally occurs at the product discharge point. A substantially increased rate of product outfeed results.

21 Claims, 9 Drawing Sheets

DIFFERENTIAL SPEED CONVEYOR ACCUMULATION SYSTEM AND METHOD

BACKGROUND OF THE INVENTION

Product accumulation systems are routinely used in conjunction with conveyors for the storage and accumulation of products which are fed from upstream sources onto conveyors. In the normal operation of a typical system, products are placed on a conveyor at the upstream location, for instance at one operational station, and then transported to a downstream location by a conveyor where the next step in the manufacture or distribution of the products is to be accomplished. When there is a disruption at a downstream location which prevents the downstream destination from accepting products, system products which would normally be transported to the area of the disruption can be received and temporarily stored by an accumulator which is integral to the system. Examples of effective product conveyor and accumulation systems are disclosed in U.S. Pat. Nos. 6,575,287 and 6,959,802.

As products with particular configurations, e.g. elongated bottles, circulate around such conveyor/accumulation systems and other conveyor systems where some products are discharged downstream while others remain in the system, they are subject to product disruptions within the system. These disruptions especially occur just prior to product discharge downstream. Discharge disruptions primarily involve the bunching and nesting of products, which result in product instability and fallen and misaligned products. The outfeed rate and hence the efficiency of the system decreases and, when the disruption blocks the discharge, the entire system usually must be stopped to address the problem.

This situation is most prevalent as products reach and contact the discharge location or discharge point, usually the front end of the product discharge guide. Upon reaching this discharge point, products may begin to bunch and nest. As additional products enter the system from the upstream destination, they push the nested products which are ahead of them, causing product instability and exacerbating what may already be a clogged outfeed.

These problems are especially troublesome and are, in fact, exacerbated when the system is started up following a shutdown to address a downstream condition. Prior to such a shutdown, the system is routinely shifted, by a diverter gate-type element or similar means, from a product delivery mode to a product accumulating mode. As discussed in the above referenced patents, this allows for product accumulation while the downstream condition is being remedied. However, upon start-up, when the gate is opened and the system is returned to its product delivery mode, the immediate rapid influx of products at the discharge location results in increased nesting, bunching, and product turbulence, which, once again, creates the real threat of disruption of product flow.

While the systems in the U.S. Pat. Nos. 6,575,287 and 6,959,802 evidence significant, novel and effective systems in the conveying and accumulation of products, the systems disclosed and discussed therein do not specifically address the above stated problems of product instability at outfeed locations, under varying operating conditions.

SUMMARY OF THE INVENTION

It is thus an object of the present invention to overcome the disadvantages and limitations of prior product conveying and accumulation systems.

It is an object of the present invention to provide a product conveying and accumulation system to control and improve product stability at the system's discharge and thus substantially eliminate the disruptions which result from this instability.

It is a further object of the present invention to provide a product conveying and accumulation system which obtains smoother product outfeed by substantially eliminating disruptions at discharge.

It is an object of the present invention to provide a product conveying and accumulation system which controls and improves product stability at the system's discharge upon immediate start-up of the system, following a shutdown to address a downstream condition.

It is another object of the present invention to provide a product conveying and accumulation system which employs the use of a separate conveyor section or lane which is stationary or a conveyor specifically operable at a slower speed than the primary product transporting conveyor or conveyors in order to improve product stability, substantially eliminate disruptions and obtain markedly smooth and increased product outfeed.

It is still another object of the present invention to provide a product conveying and accumulation system method which employs the use of a separate conveyor section or lane which is stationary or specifically operable at a slower speed than the primary product transporting conveyor or conveyors, in order to improve product stability, substantially eliminate disruption and obtain markedly smooth and increased product outfeed.

These and other objects are accomplished by the present invention, a product conveying and accumulation system and method which employs a primary product transporting conveyor with accumulation and re-circulating sections. The conveyor is configured to receive products from an upstream destination and discharge products to a downstream destination. A second conveyor, operable at a considerably slower speed than the first conveyor, is located in the same transverse plane as and is aligned adjacent to the first conveyor. Both conveyors travel in the same direction at the adjacent alignment. As products are discharged from the system, products are positioned on the slower moving conveyor. These products form a temporary wall of products on the slower moving conveyor. As a result, products on the inner discharging lane or lanes of the faster moving conveyor which would otherwise tend to move inward towards the discharge point, causing product turbulence and disruption, are urged back outward onto the inner lane or lanes by the product wall. This allows for increased separation between the discharging products and the discharge point, permitting the products to be smoothly discharged from the system to the downstream destination. A substantially increased rate of product outfeed results. The use of this slower conveyor increases product stability by substantially eliminating product turbulence caused by the bunching and nesting of products which normally occurs at the product discharge point, both during normal operation and upon start-up of the system following a shutdown. An alternate system employs the use of a stationary conveyor section or lane, in lieu of a slower moving conveyor.

Novel features which are considered as characteristic of the invention are set forth in particular in the appended claims. The invention, itself, however, both as to its design, construction and use, together with the additional features and advantages thereof, are best understood upon review of the following detailed description with reference to the accompanying drawings.

DETAILED DESCRIPTION OF THE INVENTION

Figure 1:
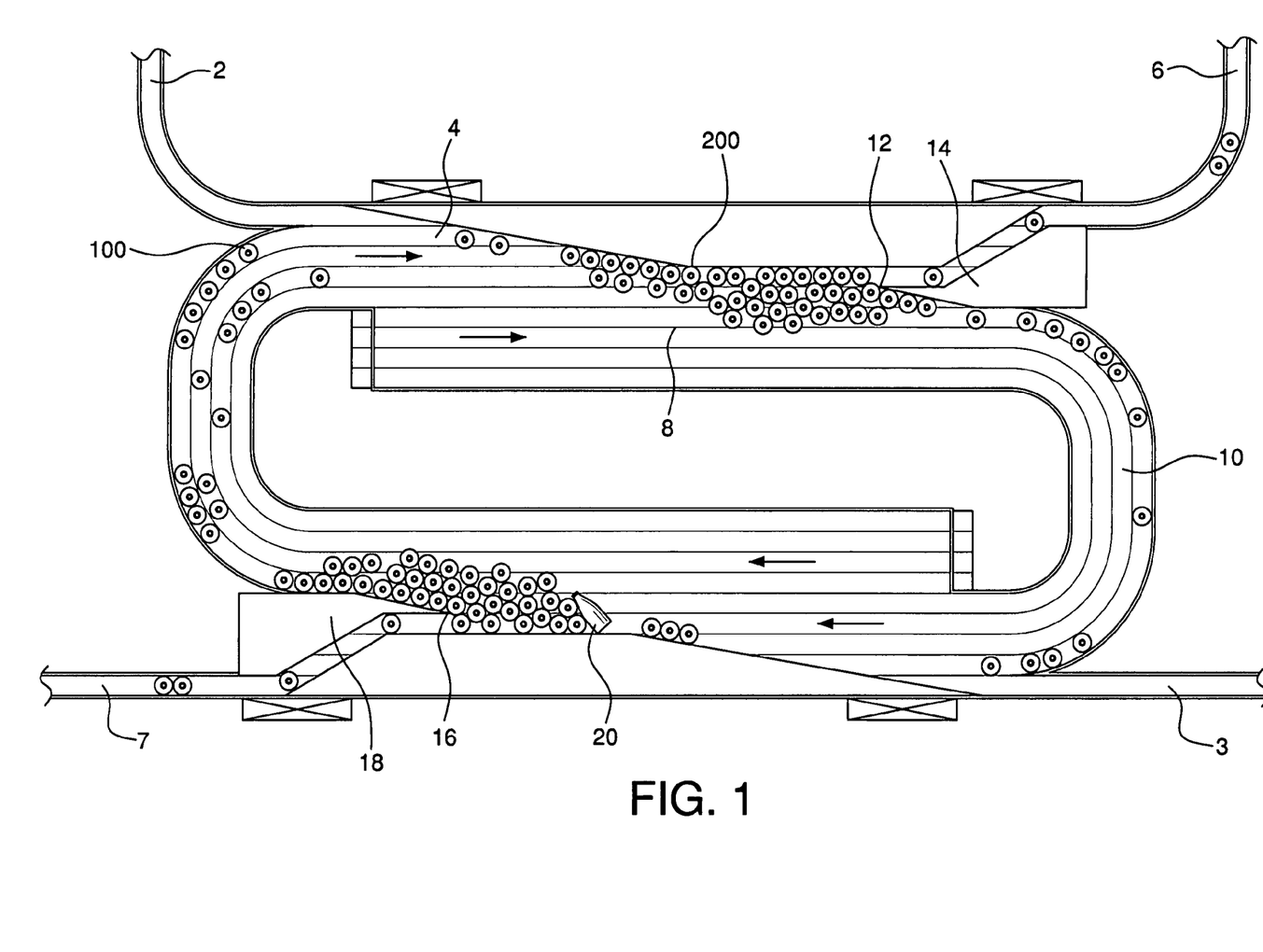
FIG. 1 is a top view of a prior art product conveying and accumulation system.

FIG. 1 is representative of a prior, popular conveying and accumulation systems. Products 100, for example bottles, are typically transported from upstream destinations 2 and 3 to conveyor system 4 which ultimately moves the products to downstream destinations 6 and 7. Accumulator section 8 is designed to accept and accumulate products which cannot yet be positioned for downstream transport. Such products are re-circulated via re-circulating section 10 for ultimate delivery to downstream destinations 6 and 7. Particular reference is made to U.S. Pat. No. 6,575,287, which describes this novel system in detail.

However, such prior systems, while most effective in transporting and accumulating products, do not address certain difficulties which arise during the movement of particular products, like elongated bottles, which, as they approach discharge locations or discharge points 12 and 16 of guide members 14 and 18, tend to bunch-up or nest at the discharge locations. This causes a crowding of products and turbulence at the discharge locations and results in a decrease in downstream outfeed delivery of products, overturned products 20 and loss of efficient downstream transport of products, and a general disruption of the smooth delivery of products downstream.

Figure 2:
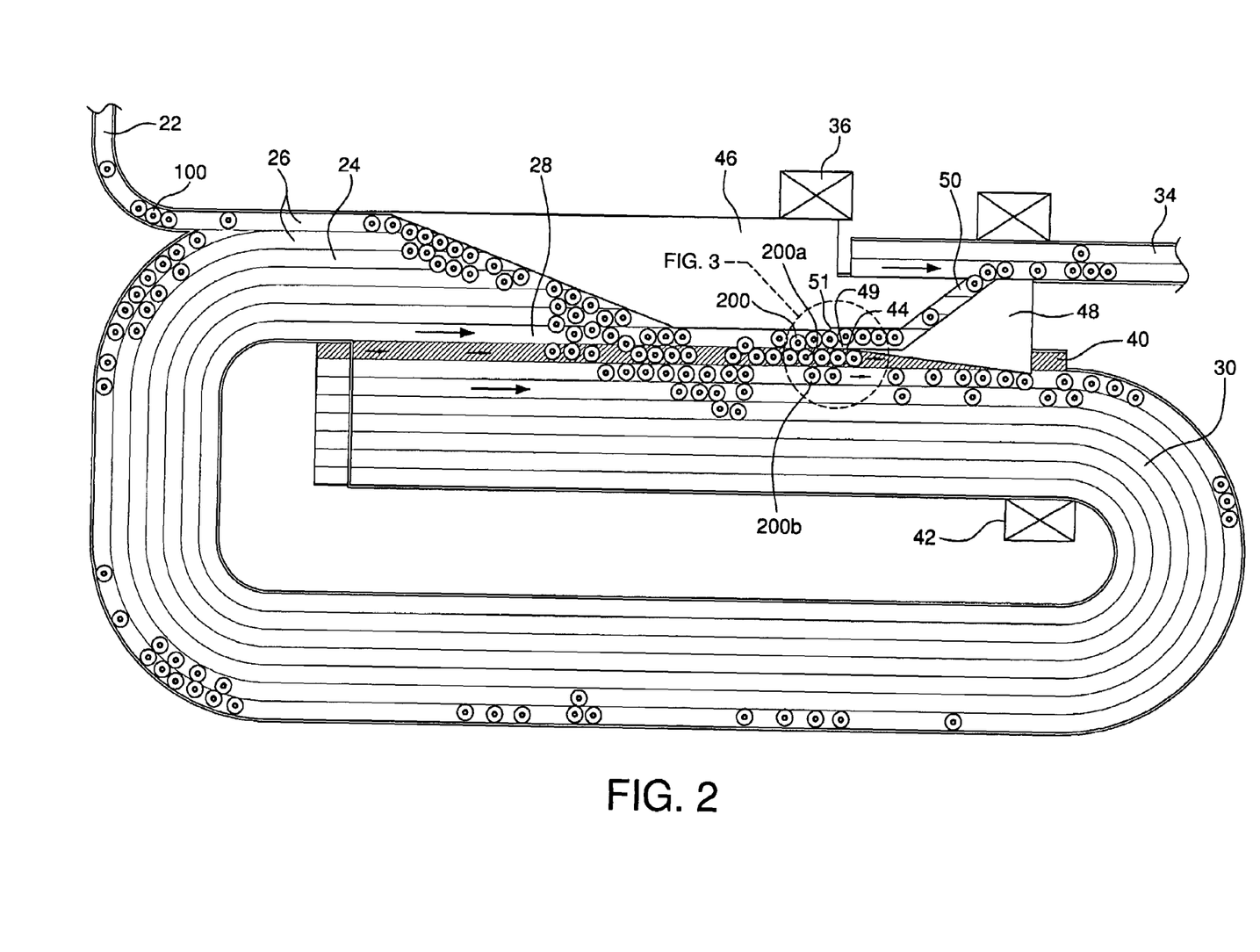
FIG. 2 is a top view of a product conveying and accumulation system employing the present invention.
Figure 3:
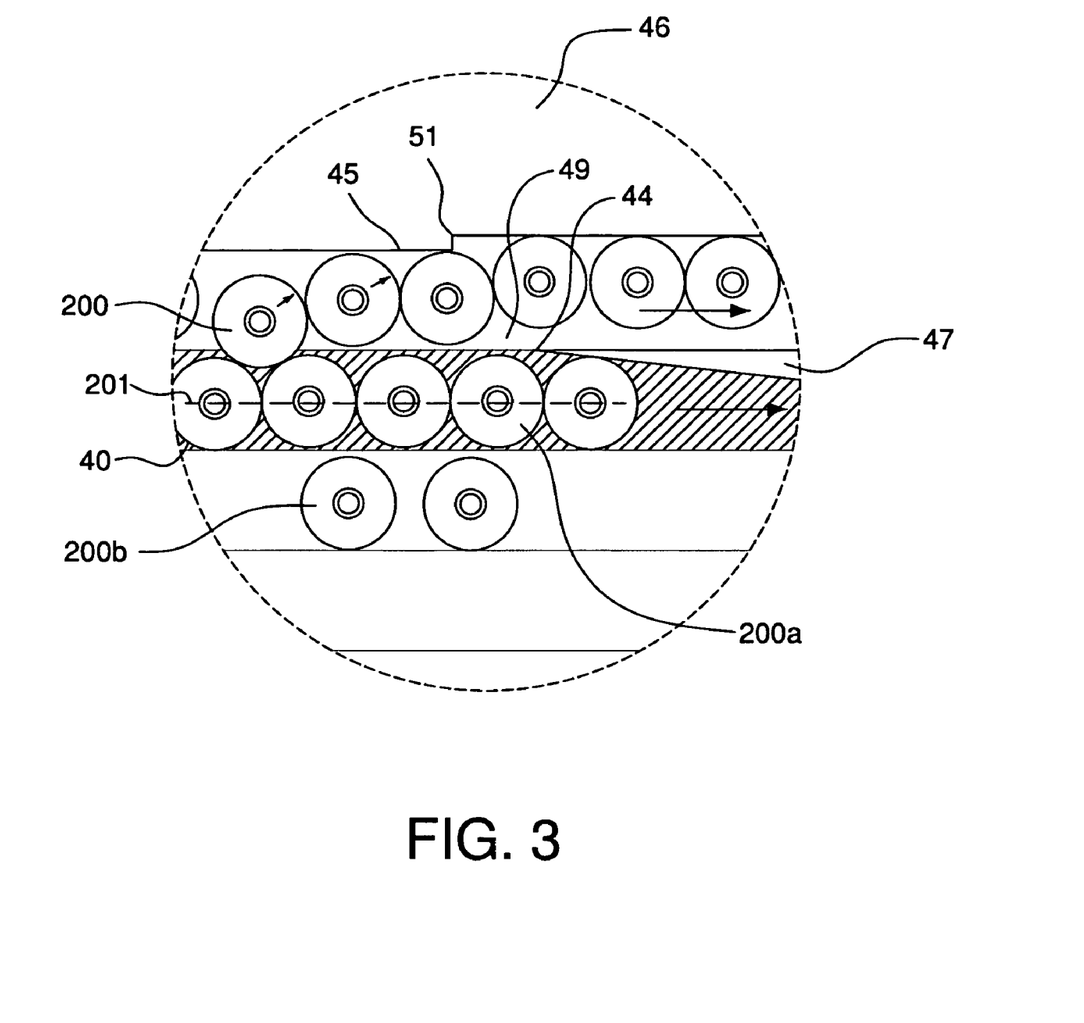
FIG. 3 is an isolated view of the product conveying and accumulation system taken from FIG. 2.
Figure 4:
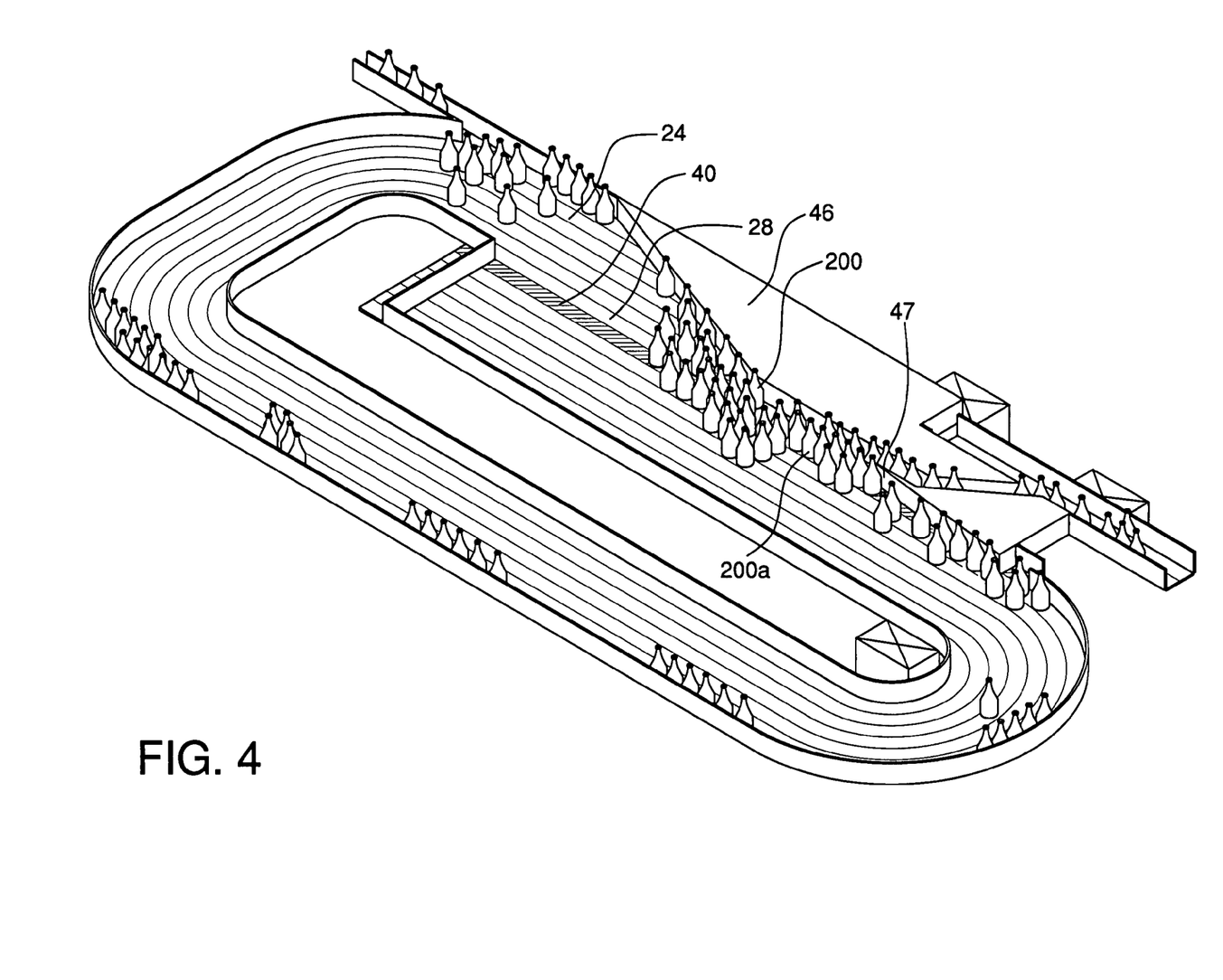
FIG. 4 is an isometric view of the product conveying and accumulation system shown in FIG. 2.

FIGS. 2-4, show a system employing the present invention which alleviates these product delivery disruption problems. Products 200, delivered from upstream destination 22, are transported onto conveyor 24, having a plurality of outer product path lanes 26, inner product path lane 28 and accumulator section 30. Products are ultimately delivered to downstream destination 34. Conveyor 24, driven by motor or similar power means 36, is operated at a constant product delivery speed in, for example, the clockwise direction shown in FIGS. 2-4.

In accordance with the present invention, second conveyor 40 is a single, continuous looped path conveyor located in a single vertical plane, aligned adjacent to inner lane 28 of conveyor 24, preferably in the same transverse plane as the inner lane. Conveyor 40 is positioned intermediate between lane 28 and accumulation section 30. Motor or similar power means 42 drives conveyor 40 in the same direction as conveyor 24, at inner lane 28, i.e. at the adjacent alignment between conveyor 40 and inner lane 28, but at a considerably slower speed than conveyor 24 and its inner lane. The particular characteristics of the products being transported and the configuration of the system will dictate the difference in speed between slower moving conveyor 40 and conveyor 24 and this speed differential is not to be considered as a restrictive of the scope of the invention.

Product guide 48 has extension 47 which terminates at discharge point or location 44. Discharge location 44 is positioned between inner path lane 28 and conveyor 40.

Operation of conveyor systems in accordance with the present invention addresses the problems and disruptions resulting from the bunching and nesting of products at the discharge location. As products 200 move from upstream destination 22 towards discharge location 44, they are compelled by inboard surfaces 45 of guide 46 towards inner path lane 28 and slower moving conveyor 40. Products 200 which remain positioned on lane 28 are delivered to downstream destination 34 through guide channel 50. Products 200a are pushed onto conveyor 40 and continue to move in the direction of conveyor 24, but since conveyor 40 is traveling at a slower speed than conveyor 24, products 200a on that conveyor also travel at that slow speed. A number of products 200b are pushed off conveyor 40 onto accumulator section 30, which recycles those products for eventual discharge to downstream destination 34.

Products 200a, traveling slowly in relation to the speed of conveyor 24, will tend to form a temporary, artificial "wall" 201 of products 200a on conveyor 40. Products 200 on fast moving inner lane 28 which would otherwise tend to move inward towards discharge location 44, causing bunching and nesting and the resulting turbulence, are urged back outward and realigned onto inner lane 28, towards inboard surfaces 45 of guide 46, by products 200a forming product wall 201. This allows for increased separation, at 49, between discharging products 200 and discharge location 44. This separation virtually eliminates contact between products 200 and discharge location 44, thus eliminating product nesting and the turbulence which results. Surface 51 of guide 46 is specifically indented in order to allow increased inward movement of products 200 as they are discharged from the system, to provide for additional separation 49 between products and discharge location 44.

The virtual elimination of turbulence at discharge location 44 results in tremendously enhanced product stability, achieving a substantially increased rate of smooth product outfeed.

Figure 5:
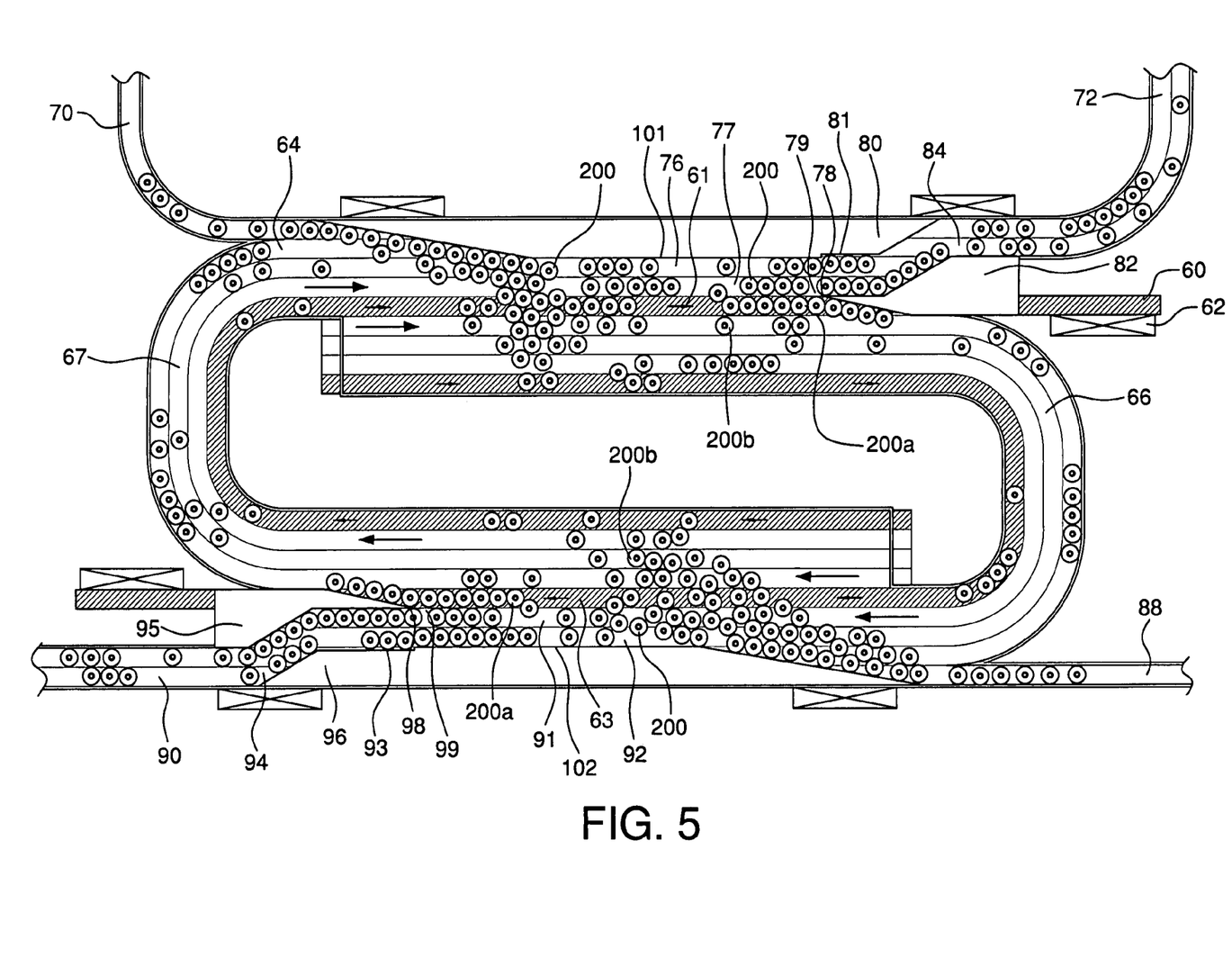
FIG. 5 is a top view of another product conveying and accumulation system showing another system arrangement employing the present invention.

FIG. 5 shows a second arrangement of the invention employed with another conveyor/accumulation system, a system with dual product feed and product outfeed. Products 200, delivered from upstream destinations 70 and 88 are transported onto conveyor 64, having outer product discharge path lanes 76 and 92 and inner product discharge path lanes 77 and 91, and accumulator sections 66 and 67. Conveyor 64 is operated at a constant product delivery speed in, for example, the clockwise direction shown in FIG. 5.

Products are directed and discharged to downstream destinations 72 and 90, by guides 80 and 82, and 95 and 96, via guide channels 84 and 94. Guides 80 and 96 have indented sections at 81 and 93 respectively.

In this embodiment, second conveyor 60 is a continuous single continuous looped path conveyor with two lower wrap-around sections. Conveyor 60 has four upper product path lanes moving in a single transverse plane, including path lanes 61 and 63, which are aligned adjacent to inner lanes 77 and 91 of conveyor 64, preferably in the same transverse plane as these inner lanes. Motor or similar power means 62 drives conveyor 60 and path lanes 61 and 63 in the same direction as conveyor 64, at inner lanes 77 and 91, i.e. the adjacent alignment between conveyor 60 and inner lanes 77 and 91, but at a slower speed than conveyor 64 and its inner lanes 77 and 91. As in the initially discussed embodiment, particular characteristics of the products being transported and the configuration of the system dictate the difference in speed between conveyor 60 and conveyor 64.

Similar to the operation described previously, as products 200 move from upstream destinations 70 and 88, towards discharge locations points 78 and 98, they are compelled by inboard surfaces 101 and 102 of guides 80 and 96 towards inner lanes 77 and 91. Products 200 which remain positioned on outer path lanes 76 and 92 are delivered to downstream destinations 72 and 90, through guide channels 84 and 94. Products 200a are pushed onto path lanes 61 and 63 of conveyor 60 and continue to move in the direction of conveyor 64, but since conveyor 60 is traveling at a slower speed, products 200a on the path lanes of that conveyor also travel at the slower speed. A number of products 200b are pushed off conveyor 60 onto accumulator sections 66 and 67, which recycles those products for eventual discharge to downstream destinations 72 and 90.

Products 200a, traveling very slowly in relation to the speed of conveyor 64, form temporary, artificial walls of products, as described previously in regard to the embodiment of FIGS. 2-4, as products 200 and 200a approach discharge locations 78 and 98. Products 200 on faster moving inner lanes 77 and 91 which would otherwise tend to move inward towards discharge locations 78 and 98, causing bunching and nesting and the resulting turbulence, are urged back outward and realigned onto inner lanes 77 and 91, and outer lanes 76 and 92, towards inboard surfaces 101 and 102 of guides 80 and 96, by products 200a forming the temporary product walls. This allows for increased separation at 79 and 99, between discharging products 200 and discharge locations 78 and 98. This separation virtually eliminates contact between products 200 and discharge locations 78 and 98, thus eliminating product nesting and the turbulence which results. Surfaces 81 and 93 of guides 80 and 96 are specifically indented in order to allow increased inward movement of products 200 as they are discharged from the system, to provide for additional separation 79 and 99 between products and discharge locations 78 and 98. Product stabilizing improvement at these discharge points, also previously described, again results in a smoother and increased outfeed of products to the downstream destinations; since the walls of products on the slow lanes inhibit the faster moving outfeed products from interacting with the discharge locations, creating separation between product and discharge locations.

Although the use of a slow lane product conveyor is shown employed with two specific product conveying and accumulation systems, the present invention should not be considered restricted to these two systems. The slow lane product conveyor is adaptable to any system which employs a primary product transport conveyor and where there is a desire to eliminate product turbulence at the point of discharge.

Figure 6:
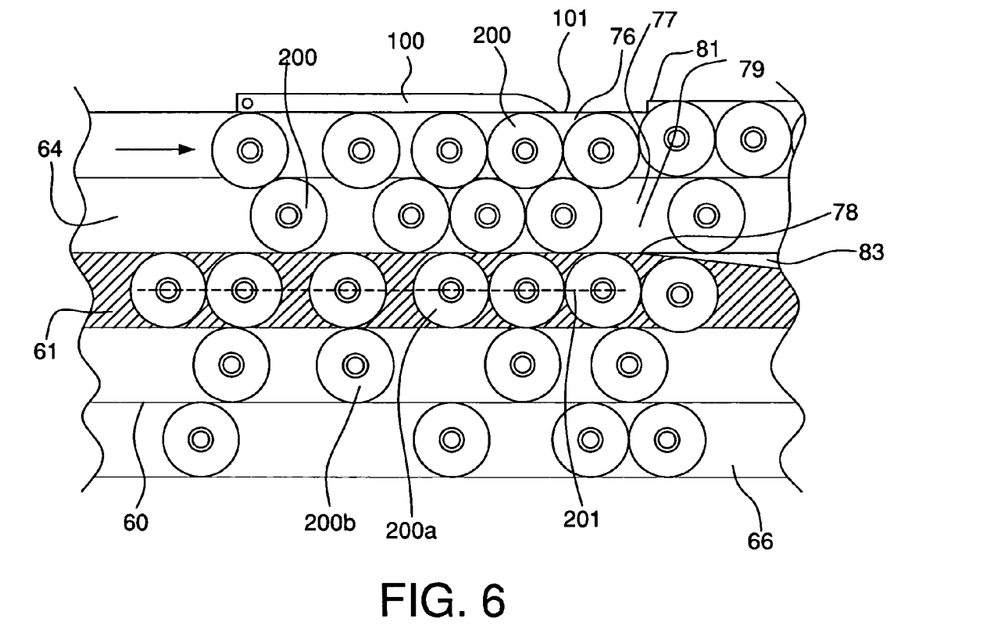
FIG. 6 is a top view of the product conveying and accumulation system of the present invention, showing a two lane product discharge, isolated at the discharge with a product diverter gate retracted.
Figure 7:
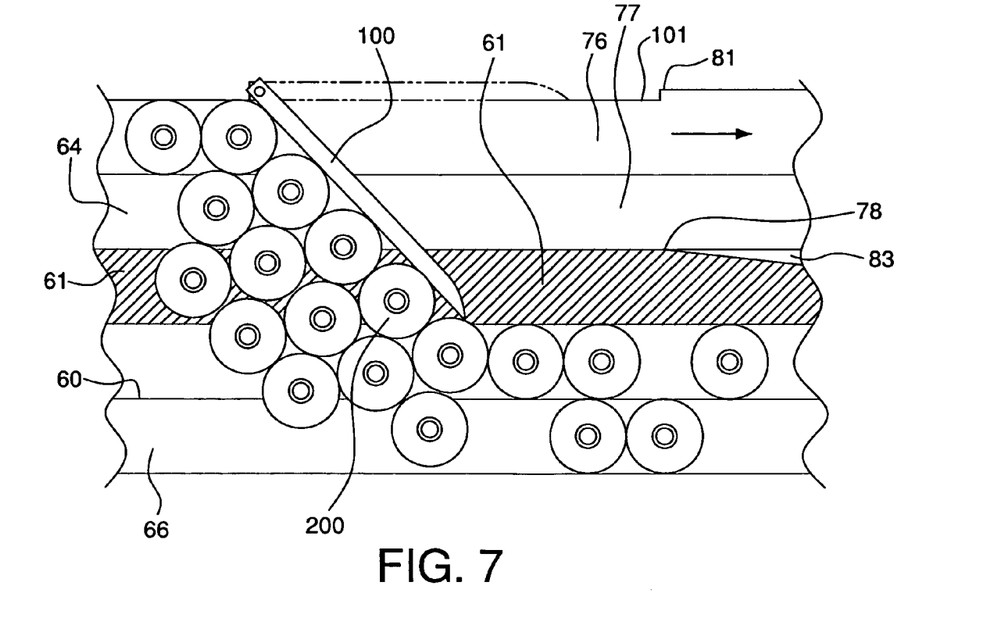
FIG. 7 is a top view showing the area in FIG. 6, with the diverter gate extended.
Figure 8:
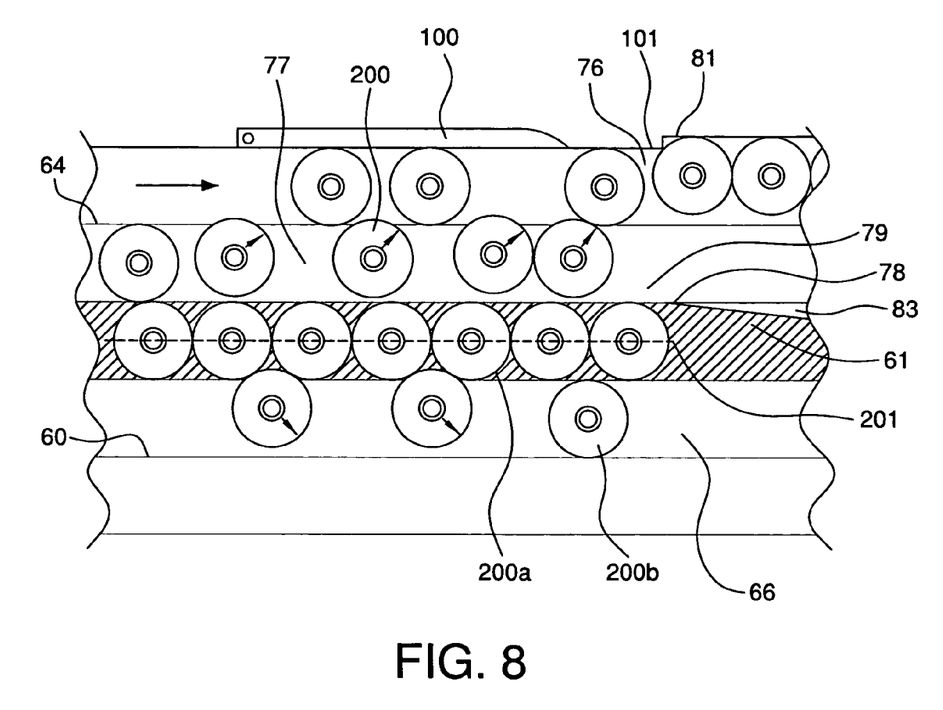
FIG. 8 is a top view showing the area in FIG. 7, depicting the flow of discharging product once the diverter gate is again retracted.

The bunching and nesting of products at discharge locations is especially problematic when a conveying system is started up following a shutdown to address a downstream condition. Prior to a shutdown, while normal product delivery operations are underway, the system will normally be shifted, by a diverter gate-type connection or similar means, from a product delivery mode to a product accumulation mode. As discussed in U.S. Pat. Nos. 6,575,287 and 6,959,802, this allows for product accumulation while the downstream condition is being remedied. However, upon start-up, when the system is returned to its product delivery mode, the immediate rapid influx of products at the discharge location results in increased nesting, bunching, and product turbulence, which creates a real problem of disruption of product flow. FIGS. 6-8 show how the present invention is particularly effective in addressing these system shut-down to start-up situations.

Referencing the system shown in FIG. 5, but isolating on the vicinity of discharge location 78, FIG. 6 shows the system in the product delivery mode, with path lanes 76 and 77 of conveyor 64 operating at a constant speed and path lane 61 of conveyor 60 operating at a slower speed. As previously discussed, products 200a on lane 61, forming temporary wall 201, serve to compel products 200 on paths 76 and 77 towards surface 101 and indented section 81 of guide 80. This creates separation, at 79, ahead of discharge location 78 at the end of extension 83 of guide 82, to eliminate product discharge turbulence.

However, when there is a disruption which must be addressed downstream and the flow of delivered products must temporarily be stopped, a gate connection, such as pivoted gate 100 shown in FIGS. 6-8, is pivoted down and extended across product delivery lanes 76 and 77 and past slow path lane 61. See FIG. 7. This causes products in all lanes to be shifted to accumulator section 66, which accumulates the products while the downstream condition is being addressed.

When the downstream condition has been remedied and product delivery is to start, gate 100 is pivoted back and retracted to once again open all lanes. If the differential speed conveyor system of the present invention is not employed, as gate 100 is pivoted back, products 200, all traveling at the same high speed, will approach discharge location 78 at this high speed. This results in the bunching, nesting and turbulence, which the invention solves. FIG. 8 shows the movement of products after gate 100 is pivoted back, when slower conveyor 60 is employed. Products 200a on slow lane 61 immediately form temporary wall 201, which compels products 200 toward surface 101 and indented section 81 and away from discharge location 78. Separation is created, at 79, between products 200 and discharge location 78, thus eliminating the ever-present product turbulence problems resulting from system start-up.

The concepts of differential speed conveyors of the present invention, will successfully work when the lane is operating at any slower speed in relation to the product delivery conveyors. However, FIGS. 9 and 10, another embodiment of the invention, evidences that the system will also work effectively if the slower lane is replaced by a stationary lane. In the system shown in FIGS. 9 and 10, products 200 delivered from upstream destination 122, are transported onto conveyor 124, having a plurality of outer product path lanes 126, inner product path lane 128 and accumulator section 130. Products are ultimately delivered to downstream destination 134. Conveyor 124, driven by motor or similar power means 136, is operated at a constant product delivery speed in, for example, the clockwise direction shown in FIGS. 9 and 10.

Figure 9:
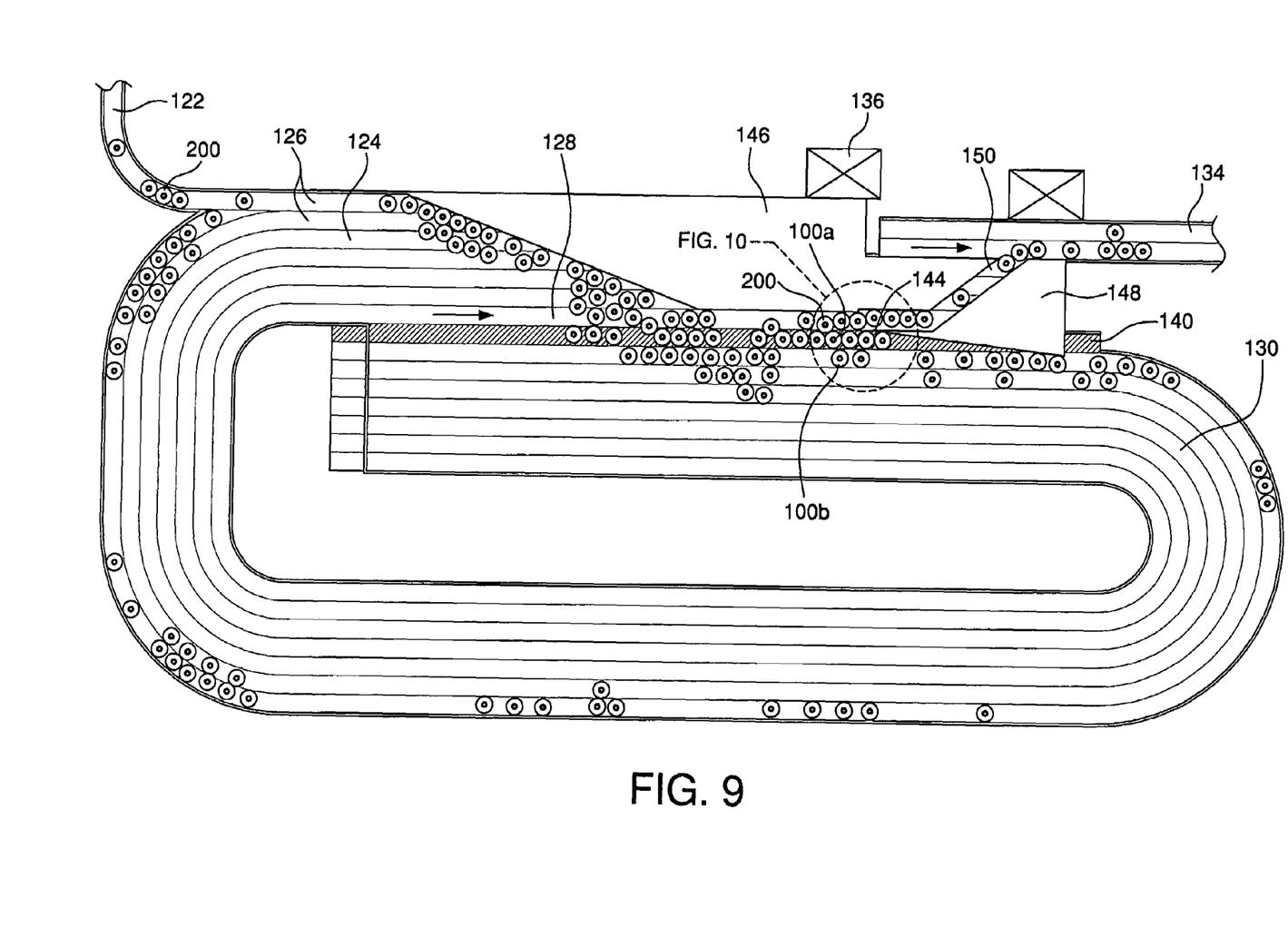
FIG. 9 is a top view of the product conveying and accumulation system showing another embodiment of the present invention.
Figure 10:
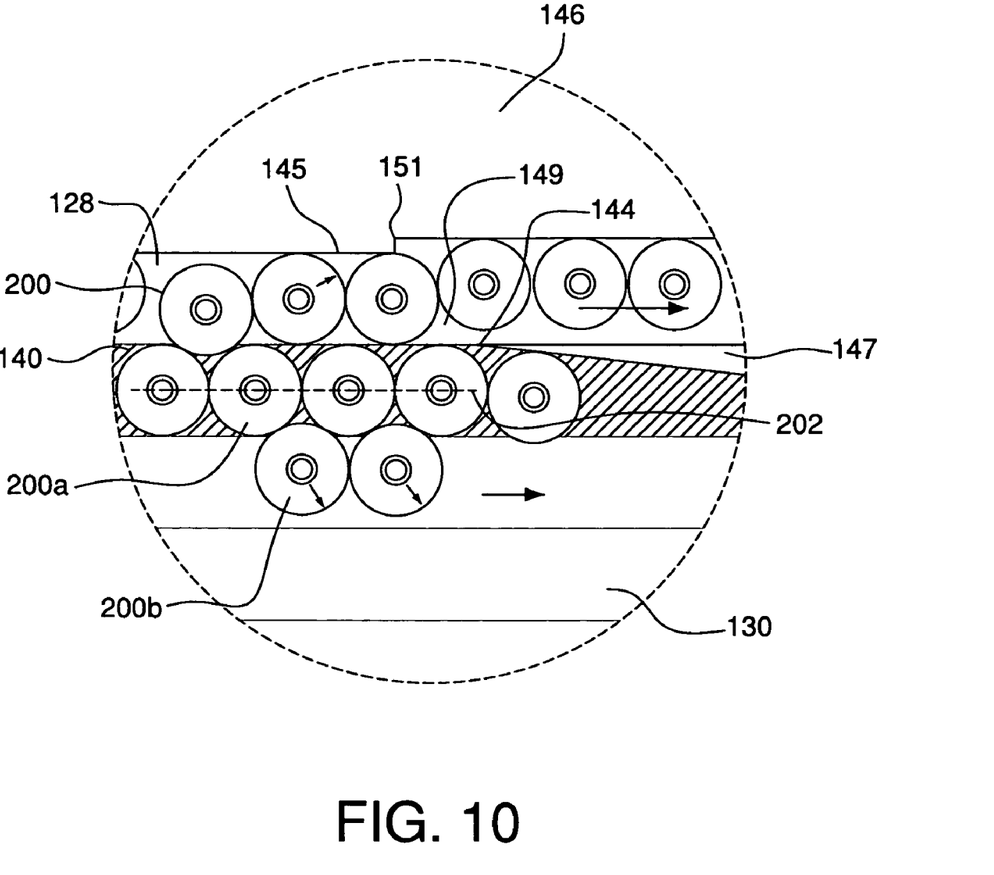
FIG. 10 is an isolated view of the product conveying and accumulation system taken from FIG. 9.

In accordance with this embodiment of the invention, a stationary lane or stationary conveyor section 140, is aligned adjacent to inner lane 128 of conveyor 124, and intermediate of lane 128 and accumulation section 130 and preferably in the same transverse plane as the inner lane and accumulator. Product guide 148 has extension 147 which terminates at discharge point or location 144. Discharge location 144 is positioned between inner path lane 128 and stationary lane 140.

Operation of this embodiment is similar to that which has been described previously, with regard to the slow lane systems. As products 200 move from upstream destination 122 towards discharge location 144, they are compelled by inboard surfaces 145 of guide 146 towards inner path lane 128 and stationary lane 140. Products 200 which remain positioned on lane 128 are delivered to downstream destination 134 through guide channel 150. Products 200a are pushed onto stationary lane 140 and continue to move in the direction of conveyor 124, but since lane 140 is stationary, products 200a on the lane also remain substantially static or stationary. Several products 200b on lane 140 will be slightly nudged off the lane by products 200 traveling on lane 128 and they will eventually be shifted onto accumulator section 130. However, most of the static positioned products 200a will form a temporary wall 202, which, as described previously, act to compel products 200 back outward towards inboard surface 145 and indented section 151 of guide 146. The ensuing separation between products 200 and discharge location 144, at 149, once again, eliminates the product turbulence.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A product conveying and accumulation system, said system comprising:
   first conveying means for the movement of products from an upstream destination to a product discharge location, said first conveying means moving in a designated direction and at a constant speed; and
   second conveying means for receiving products from the first conveying means at a location upstream of the discharge location, said second conveying means continually moving at a constant speed slower than the first conveying means and being aligned substantially adjacent to the first conveying means from the upstream location to the discharge location and, at this adjacent alignment, being parallel to and in direct side by side contact with the first conveying means, the first and second conveying means moving side by side in the same direction at the adjacent alignment from the upstream location to the discharge location, whereby products are moved from the first conveying means directly onto the second conveying means at the upstream location of the adjacent alignment, said products moving at said slower constant speed than the products on the first conveying means such that products approaching said product discharge location from the upstream location are compelled away from the product discharge location, causing product separation with and substantially eliminating product turbulence and instability at the product discharge location.

2. The product conveying and accumulation system as in claim 1 wherein the first conveying means and the second conveying means are in substantially the same transverse plane at the adjacent alignment.

3. The product conveying and accumulation system as in claim 1 further comprising guide means substantially located at the product discharge location for directing products from the first conveying means to a downstream destination.

4. The product conveying and accumulation system as in claim 1 wherein the second conveying means comprises a single, continuous looped path conveyor.

5. The product conveying and accumulation system as in claim 1 in which there are multiple product discharge locations.

6. The product conveying and accumulation system as in claim 1 further comprising drive means for moving the first conveyor means at the constant speed and for moving the second conveyor means at a speed slower than the first conveying means.

7. A product conveying and accumulation system, said system comprising:
   first conveying means for the movement of products from an upstream destination to a product discharge location;
   drive means for moving the first conveying means and products on the first conveying means in a designated direction and at a constant speed;
   second conveying means for receiving products from the first conveying means at a location upstream of the discharge location, said second conveying means being aligned substantially adjacent to the first conveying means from the upstream location to the discharge location and, at this adjacent alignment, being parallel to and in direct side by side contact with the first conveying means, the first and second conveying means moving side by side in the same direction at the adjacent alignment from the upstream location to the discharge location; and
   second drive means for continually moving the second conveying means and products on the second conveying means received from the first conveying means at a constant speed slower than the speed of the first conveying means, whereby products are moved from the first conveying means directly onto the second conveying means at the upstream location of the adjacent alignment, said products moving at said slower constant speed than the products on the first conveying means such that products approaching said discharge location from the upstream location are compelled away from the product discharge location, causing product separation with and substantially eliminating product turbulence and instability at the product discharge location.

8. The product conveying and accumulation system as in claim 7 wherein the first and second conveying means are in substantially the same transverse plane at the adjacent alignment.

9. The product conveying and accumulation system as in claim 7 further comprising guide means substantially located at the product discharge location for directing products from the fist conveying means to a downstream destination.

10. The product conveying and accumulation system as in claim 7 wherein the second conveying means comprises a single, continuous loop conveyor.

11. The product conveying and accumulation system as in claim 7 comprising multiple product discharge locations.

12. A product conveying and accumulation system, said system comprising:
a first conveying means for the movement of products from an upstream destination to a downstream product discharge location, said first conveying means comprising inner path means located directly adjacent to and in side by side contact with outer path means, products being moved at a designated speed and direction on both path means;
a second conveying means for receiving products from the inner path means of the first conveying means at a location upstream of the discharge location, said second conveying means continually moving in the same direction and at a constant speed slower than the inner path means, and being substantially adjacent to the inner path means from the upstream location to the discharge location and, at this adjacent alignment, being parallel to and in direct side by side contact with the first conveying means, the inner path means and the second conveying means moving side by side in the same direction at the adjacent alignment from the upstream location to the discharge location, whereby products are moved from the outer path means directly onto the inner path means at the upstream location and from the inner path means directly onto the second conveying means at the upstream location of the adjacent alignment, said products moving at said slower constant speed on the second conveying means than the products on the inner or outer path means, such that products on the inner path means approaching said product discharge location from the upstream location are compelled away from the product discharge location, causing product separation with and substantially eliminating product turbulence and instability at the discharge location.

13. The product conveying and accumulation system as in claim 12 wherein the first and second conveying means are in substantially the same transverse plane at said adjacent alignment.

14. The product conveying and accumulation system as in claim 12 further comprising guide means for directing products from the first conveying means to a downstream destination.

15. The product conveying and accumulation system as in claim 12 wherein the second conveying means comprises a single, continuous looped path conveyor.

16. The product conveying and accumulation system as in claim 12 wherein the second conveying means is substantially located in a single vertical plane.

17. The product conveying and accumulation system as in claim 12 further comprising drive means for moving the first conveyor means at the designated speed and for moving the second conveyor means at a slower speed than the first conveyor means.

18. A method of transporting and accumulating products, said method comprising the steps of:
providing a first conveyor for transporting products from an upstream destination to a product discharge location;
providing power means for moving the first conveyor at a designated speed and designated direction;
moving the first conveyor at a designated speed and a designated direction;
aligning a second conveyor substantially adjacent to the first conveying means from the upstream location to the discharge location and, at this adjacent alignment, parallel to and in direct side by side contact with the first conveyor from the upstream location to the discharge location;
providing power means for moving the second conveyor at a constant speed slower than the speed of the first conveyor;
moving said second conveyor side by side with and at a constant speed slower than the speed of the first conveyor and, at the adjacent alignment, in the same direction as the first conveyor;
placing products on the first conveyor;
moving the products on the first conveyor towards the product discharge location at the designated speed of the first conveyor;
delivering products from the first conveyor directly onto the second conveyor at the upstream location of the adjacent alignment;
moving the products on the second conveyor towards the product discharge location at the slower constant speed of the second conveyor;
establishing separation between the products and the product discharge location during movement of products on the first and second conveyors toward the product discharge location,
substantially eliminating product turbulence and instability at the product discharge location; and
transporting products from the first conveyor to a downstream destination.

19. The method as in claim 18 further providing a discharge guide to direct products from the first conveyor means to the downstream destination.

20. The method as in claim 19 further comprising forming a wall of products on the second conveyor at the adjacent alignment which inhibits products being transported from the first conveyor to the downstream destination from contacting the guide, thereby disrupting the transportation and accumulation of products.

21. The method as in claim 18 further comprising compelling products being transported from the first conveyor to the downstream destination away from the product discharge location.

* * * * *